United States Patent
Xie et al.

(10) Patent No.: US 12,498,901 B2
(45) Date of Patent: Dec. 16, 2025

(54) DATA PROCESSING METHOD, APPARATUS, ELECTRONIC DEVICE, AND STORAGE MEDIUM

(71) Applicants: Beijing Volcano Engine Technology Co., Ltd., Beijing (CN); Lemon Inc., Grand Cayman (KY)

(72) Inventors: Kai Xie, Singapore (SG); Han Qian, Beijing (CN)

(73) Assignees: Beijing Volcano Engine Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/617,630

(22) Filed: Mar. 26, 2024

(65) Prior Publication Data

US 2024/0329925 A1 Oct. 3, 2024

(30) Foreign Application Priority Data

Mar. 30, 2023 (CN) .......................... 202310331865.5

(51) Int. Cl.
*G06F 7/08* (2006.01)
*G06F 7/14* (2006.01)
*G06F 16/11* (2019.01)

(52) U.S. Cl.
CPC .................. *G06F 7/08* (2013.01); *G06F 7/14* (2013.01); *G06F 16/116* (2019.01)

(58) Field of Classification Search
CPC . G06F 7/08; G06F 7/14; G06F 16/116; G06F 3/0638; G06F 3/0661; G06F 3/067; G06F 3/061; G06N 20/00; Y02D 10/00
See application file for complete search history.

(56) References Cited

U.S. PATENT DOCUMENTS 10,860,533 B1 * 12/2020 Neilsen .................... G06F 16/14
11,899,680 B2 * 2/2024 Gattani ................. G06F 16/254
12,105,600 B1 * 10/2024 Yadav ................. G06F 11/1451
(Continued)

FOREIGN PATENT DOCUMENTS

CN 109033295 A 12/2018
CN 111190895 A 5/2020

OTHER PUBLICATIONS

European Search Report for EP Patent Application No. 24167746.7, Issued on Sep. 24, 2024, 9 pages.
(Continued)

*Primary Examiner* — Debbie M Le

(57) ABSTRACT

A data processing method, apparatus, device, and storage medium are provided. The method includes acquiring a data reading task; determining the target feature data from a data file stored in a target storage system based on the data reading task and metadata corresponding to the target storage system; reading the target feature data from the data file based on operation semantic information corresponding to the target feature data, and determining the read target feature data as the first target feature data; and merging the first target feature data to acquire target merged feature data in the case that the size of data volume of the read first target feature data meets a preset condition, and repeating the process of reading and merging the first target feature data until a completion of reading of the target feature data in the data file.

20 Claims, 3 Drawing Sheets

(56) References Cited

U.S. PATENT DOCUMENTS

| | | | |
|---|---|---|---|
| 12,174,845 B1 * | 12/2024 | Gordon | ............... G06F 11/1458 |
| 2019/0005407 A1 | 1/2019 | Harris et al. | |
| 2020/0019331 A1 | 1/2020 | Ren et al. | |

OTHER PUBLICATIONS

Communication Pursuant to Rules 70(2) and 70a(2) EPC and reference to Rule 39(1) EPC for European Application No. 24167746.7, mailed Oct. 28, 2024, 2 pages.

* cited by examiner

DATA PROCESSING METHOD, APPARATUS, ELECTRONIC DEVICE, AND STORAGE MEDIUM

CROSS-REFERENCE TO RELATED APPLICATION

The present application claims priority of the Chinese Patent Application No. 202310331865.5, filed on Mar. 30, 2023, the disclosure of which is incorporated herein by reference in its entirety as part of the present application.

TECHNICAL FIELD

The present disclosure relates to the technical field of data storage, in particular to a data processing method, an apparatus, an electronic device, and a storage medium.

BACKGROUND

With the development of artificial intelligence technology, machine learning has an increasing demand for training data, and in order to facilitate the management of large quantities of the training data, storage systems are usually used to store the data. Since the training data in the storage system usually changes, it is usually necessary to merge relevant data before using the training data, for example, to load all the training data to be read into a memory for merging, which may lead to data overflow into a disk when the training data volume is large, thus leading to the degradation of data reading performance.

SUMMARY

The embodiment of the present disclosure at least provides a data processing method, an apparatus, an electronic device and a storage medium.

The embodiment of the disclosure provides a data processing method, which includes:
  acquiring a data reading task, in which the data reading task is used for indicating target feature data to be read currently;
  determining the target feature data from a data file stored in a target storage system based on the data reading task and metadata corresponding to the target storage system, in which feature data in the data file is stored in columns;
  reading the target feature data from the data file based on operation semantic information corresponding to the target feature data, and determining the read target feature data as the first target feature data, in which the operation semantic information comprises one of update semantics, insertion semantics, deletion semantics, and insertion-update semantics; and
  merging the first target feature data to acquire target merged feature data in the case that a size of data volume of the read first target feature data meets a preset condition, and repeating a process of reading and merging the first target feature data until a completion of reading of the target feature data in the data file.

In an implementation, the target storage system stores a plurality of data files, and each of the plurality of data files corresponds to one metadata, and the determining the target feature data from a data file stored in a target storage system based on the data reading task and metadata corresponding to the target storage system, comprises:
  determining a plurality of target data files from the plurality of data files based on the data reading task and metadata corresponding to each data file, and determining the target feature data from the plurality of target data files.

The reading the target feature data from the data file based on operation semantic information corresponding to the target feature data, and determining the read target feature data as the first target feature data, comprises:
  reading respectively the target feature data from the plurality of target data files based on the operation semantic information corresponding to the target feature data, and determining the read target feature data as the first target feature data.

In an implementation, the reading the target feature data from the data file based on operation semantic information corresponding to the target feature data, and determining the read target feature data as the first target feature data, comprises:
  converting a memory view of feature data stored in columns in each target data file into a memory view stored in rows; and
  reading respectively the target feature data from the plurality of target data files based on the operation semantic information corresponding to the target feature data, and determining the read target feature data as the first target feature data.

The merging the first target feature data to acquire target merged feature data in the case that a size of data volume of the read first target feature data meets a preset condition, comprises:
  in the case that the size of data volume of the read first target feature data meets the preset condition, merging the first target feature data to acquire first merged feature data; and
  converting a memory view stored in rows of the first merged feature data into a memory view stored in columns to acquire the target merged feature data.

In an implementation, the reading respectively the target feature data from the plurality of target data files based on the operation semantic information corresponding to the target feature data, and determining the read target feature data as the first target feature data, comprises:
  reading respectively the target feature data from the plurality of target data files in a multi-core parallel mode, based on the operation semantic information corresponding to the target feature data, and determining the read target feature data as the first target feature data.

In an implementation, the metadata of each data file comprises a primary key corresponding to each feature data, and the reading respectively the target feature data from the plurality of target data files based on the operation semantic information corresponding to the target feature data, and determining the read target feature data as the first target feature data, comprises:
  sorting a primary key of the target feature data in each target data file to acquire a sorting result; and
  reading the target feature data from the plurality of target data files according to a plurality of sorting results based on the operation semantic information corresponding to the target feature data, and determining the read target feature data as the first target feature data.

In an implementation, the metadata of each data file further comprises a writing time of each feature data, and the sorting a primary key of the target feature data in each target data file to acquire a sorting result, comprises:

in the case that target feature data having the same primary key exists, sorting the target feature data having the same primary key based on a sequence of writing times of the target feature data to acquire the sorting result.

In an implementation, the reading the target feature data from the plurality of target data files according to a plurality of sorting results based on the operation semantic information corresponding to the target feature data, and determining the read target feature data as the first target feature data, comprises:

determining, for current target feature data read according to each sorting result, whether baseline data corresponding to the current target feature data in the target feature data that has been read exists or not, in which the baseline data is feature data that has the same primary key of the target feature data and is processed for the first time;

in the case that the baseline data corresponding to the current target feature data exists and the operation semantic information of the current target feature data is one of the update semantics, the insertion semantics, and the insertion-update semantics, determining the current target feature data as change data, and in the case that reading of the target feature data corresponding to the primary key of the current target feature data is completed, storing the baseline data and the change data into a container, and determining the baseline data and the change data as the first target feature data.

In an implementation, the method further comprises:

in the case that the baseline data corresponding to the current target feature data does not exist and the operation semantic information of the current target feature data is the insertion semantics or the insertion-update semantics, determining the current target feature data as the baseline data.

In an implementation, in the case that the baseline data corresponding to the current target feature data exists and the operation semantic information of the current target feature data is the deletion semantics, deleting the baseline data and the current target feature.

In an implementation, the metadata of each data file comprises a primary key corresponding to each feature data, the in the case that the size of data volume of the read first target feature data meets the preset condition, merging the first target feature data to acquire first merged feature data, comprises:

merging the first target feature data having the same primary key based on a preset merging rule to acquire first sub-merged feature data corresponding to each primary key; and acquiring the first merged feature data based on the first sub-merged feature data corresponding to each primary key.

In an implementation, the metadata of each data file further comprises a writing time of each feature data and a version number corresponding to each data file, and in the case that the first target feature data having the same primary key is same feature data, the merging the first target feature data having the same primary key based on a preset merging rule to acquire the first sub-merged feature data corresponding to each primary key, comprises:

according to the writing time of each first target feature data having the same primary key, determining second target feature data corresponding to last writing time from the first target feature data, and determining the second target feature data as the first sub-merged feature data corresponding to the primary key; or, according to a version number of a target data file to which each first target feature data having the same primary key belongs, determining the third target feature data belonging to the target data file having a latest version number from the first target feature data, and determining the third target feature data as the first sub-merged feature data corresponding to the primary key.

In an implementation, the metadata of each data file further comprises file attribute information corresponding to each data file, and the determining a plurality of target feature data from the plurality of target data files, comprises:

acquiring the first filtering requirement in the case that the first target data file having file attribute information as a newly added attribute exists among the plurality of target data files, in which the first target data file having the newly added attribute indicates that feature data in the first target data file is different from feature data in other target data files except the first target data file among the plurality of target data files;

based on the first filtering requirement, determining the fourth target feature data meeting the first filtering requirement from the first target data file and a target primary key corresponding to the fourth target feature data, in which the first filtering requirement is determined by a user;

for each target primary key, determining the fifth target feature data corresponding to a target primary key from other target data files except the first target data file among the plurality of target data files; and determining the fourth target feature data and the fifth target feature data corresponding to each target primary key as the target feature data.

In an implementation, the metadata of the data file further comprises file attribute information corresponding to the data file, and the method further comprises:

reading the target feature data from the data file in the case that the file attribute information of the data file indicates that the data file is a merged data file.

The embodiment of the present disclosure also provides a data processing apparatus, which includes an acquiring module, a determining module, a reading module, and a merging module.

The acquiring module is configured to acquire data reading task. The data reading task is used for indicating target feature data to be read currently.

The determining module is configured to determine the target feature data from a data file stored in a target storage system based on the data reading task and metadata corresponding to the target storage system, and feature data in the data file is stored in columns.

The reading module is configured to read the target feature data from the data file based on operation semantic information corresponding to the target feature data, and determining the read target feature data as the first target feature data. The the operation semantic information comprises one of update semantics, insertion semantics, deletion semantics, and insertion-update semantics.

The merging module is configured to merge the first target feature data to acquire target merged feature data in the case that the size of data volume of the read first target feature data meets a preset condition, and repeat a process of reading and merging the first target feature data until a completion of reading of the target feature data in the data file.

In an implementation, the target storage system stores a plurality of data files, and each of the plurality of data files corresponds to one metadata, and the determining module is configured to:
  determine a plurality of target data files from the plurality of data files based on the data reading task and metadata corresponding to each data file, and determine the target feature data from the plurality of target data files.

The reading module is configured to:
  read respectively the target feature data from the plurality of target data files based on the operation semantic information corresponding to the target feature data, and determine the read target feature data as the first target feature data.

In an implementation, the reading module is configured to:
  convert a memory view of feature data stored in columns in each target data file into a memory view stored in rows; and
  read respectively the target feature data from the plurality of target data files based on the operation semantic information corresponding to the target feature data, and determine the read target feature data as the first target feature data.

The merging module is configured to:
  in the case that the size of data volume of the read first target feature data meets the preset condition, merge the first target feature data to acquire first merged feature data; and
  convert a memory view stored in rows of the first merged feature data into a memory view stored in columns to acquire the target merged feature data.

In an implementation, the reading module is configured to:
  read respectively the target feature data from the plurality of target data files in a multi-core parallel mode, based on the operation semantic information corresponding to the target feature data, and determine the read target feature data as the first target feature data.

In an implementation, the metadata of each data file comprises a primary key corresponding to each feature data, and the reading module is configured to:
  sort a primary key of the target feature data in each target data file to acquire a sorting result; and
  read the target feature data from the plurality of target data files according to a plurality of sorting results based on the operation semantic information corresponding to the target feature data, and determine the read target feature data as the first target feature data.

In an implementation, the metadata of each data file further comprises a writing time of each feature data, and the reading module is configured to:
  in the case that target feature data having the same primary key exists, sort the target feature data having the same primary key based on a sequence of writing times of the target feature data to acquire the sorting result.

In an implementation, the reading module is configured to:
  determine, for current target feature data read according to each sorting result, whether baseline data corresponding to the current target feature data in the target feature data that has been read exists or not, in which the baseline data is feature data that has the same primary key of the target feature data and is processed for the first time;
  in the case that the baseline data corresponding to the current target feature data exists and the operation semantic information of the current target feature data is one of the update semantics, the insertion semantics, and the insertion-update semantics, determine the current target feature data as change data, and in the case that reading of the target feature data corresponding to the primary key of the current target feature data is completed, store the baseline data and the change data into a container, and determine the baseline data and the change data as the first target feature data.

In an implementation, the reading module is configured to:
  in the case that the baseline data corresponding to the current target feature data does not exist and the operation semantic information of the current target feature data is the insertion semantics or the insertion-update semantics, determine the current target feature data as the baseline data.

In an implementation, the reading module is configured to:
  in the case that the baseline data corresponding to the current target feature data exists and the operation semantic information of the current target feature data is the deletion semantics, delete the baseline data and the current target feature.

In an implementation, the metadata of each data file comprises a primary key corresponding to each feature data, the merging module is configured to:
  merge the first target feature data having the same primary key based on a preset merging rule to acquire first sub-merged feature data corresponding to each primary key; and
  acquire the first merged feature data based on the first sub-merged feature data corresponding to each primary key.

In an implementation, the metadata of each data file further comprises a writing time of each feature data and a version number corresponding to each data file, and in the case that the first target feature data having the same primary key is the same feature data, the merging module is configured to:
  according to the writing time of each first target feature data having the same primary key, determine the second target feature data corresponding to last writing time from the first target feature data, and determine the second target feature data as the first sub-merged feature data corresponding to the primary key; or,
  according to a version number of a target data file to which each first target feature data having the same primary key belongs, determine the third target feature data belonging to the target data file having the latest version number from the first target feature data, and determine the third target feature data as the first sub-merged feature data corresponding to the primary key.

In an implementation, the metadata of each data file further comprises file attribute information corresponding to each data file, and the determining module is configured to:
  acquire the first filtering requirement in the case that the first target data file having file attribute information as a newly added attribute exists among the plurality of target data files, in which the first target data file having the newly added attribute indicates that feature data in the first target data file is different from feature data in other target data files except the first target data file among the plurality of target data files;

based on the first filtering requirement, determine the fourth target feature data meeting the first filtering requirement from the first target data file and a target primary key corresponding to the fourth target feature data, in which the first filtering requirement is determined by a user;

for each target primary key, determine the fifth target feature data corresponding to a target primary key from other target data files except the first target data file among the plurality of target data files; and determine the fourth target feature data and the fifth target feature data corresponding to each target primary key as the target feature data.

In an implementation, the metadata of the data file further comprises file attribute information corresponding to the data file, and the reading module is configured to:

read the target feature data from the data file in the case that the file attribute information of the data file indicates that the data file is a merged data file.

The embodiment of the present disclosure further provides an electronic device, which includes a processor, a memory and a bus. The memory stores machine-readable requests executable by the processor, the processor communicates with the memory via the bus when the electronic device is in operation, and the machine-readable requests, when executed by the processor, cause the processor to perform the steps of the data processing method described in any possible embodiment.

The embodiment of the present disclosure further provides a computer-readable storage medium. The computer programs are stored on the computer-readable storage medium, and the computer programs, when executed by a processor, cause the processor to perform the steps of the data processing method described in any possible embodiment.

In order to make the above purposes, features and advantages of the present disclosure more obvious and understandable, the following better embodiments, together with the accompanying drawings, are described in detail as follows.

BRIEF DESCRIPTION OF DRAWINGS

In order to more clearly illustrate technical solutions of the embodiments of the present disclosure, following is a brief introduction to accompanying drawings to be used in the embodiments, which are herein incorporated in the specification and form a part hereof, and which show embodiments conforming to the present disclosure and are used together with the specification to illustrate the technical solutions of the present disclosure. It should be understood that the following drawings show only certain embodiments of the present disclosure, and therefore should not be regarded as limiting a scope, and other relevant drawings may be acquired from these drawings by a person of ordinary skill in art without creative labor.

DETAILED DESCRIPTION

Figure 1:
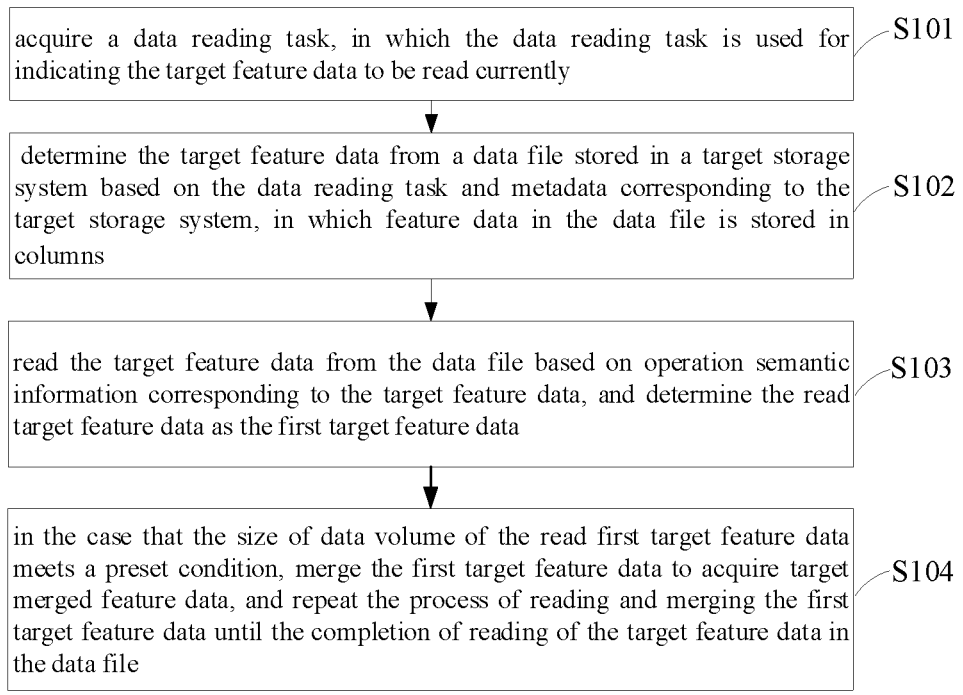
FIG. 1 illustrates a flowchart of a data processing method provided by some embodiments of the present disclosure.

In order to make purposes, technical solutions and advantages of the embodiments of the present disclosure clearer, the technical solutions in the embodiments of the present disclosure will be clearly and completely described below in conjunction with the accompanying drawings in the embodiments of the present disclosure, and it is clear that described embodiments are only a part of the embodiments of the present disclosure, and not all of the embodiments. The components of embodiments of the present disclosure generally described and illustrated in the accompanying drawings herein may be arranged and designed in a variety of different configurations. Accordingly, the following detailed description of embodiments of the present disclosure provided in the accompanying drawings is not intended to limit the scope of the present disclosure for which protection is claimed, but rather represents only selected embodiments of the present disclosure. Based on the embodiments of the present disclosure, all other embodiments acquired by a person skilled in art without creative labor are within the scope of protection of the present disclosure.

It should be noted that similar symbols and letters denote similar items in the following accompanying drawings, and therefore, once an item is defined in an accompanying drawing, it does not need to be further defined and explained in subsequent accompanying drawings.

The term "and/or", as used herein, merely describes an associative relationship, indicating that three relationships can exist, e.g., A and/or B, which may mean: A alone, both A and B, or B alone. In addition, the term "at least one" herein denotes any one of a plurality or any combination of at least two of a plurality, e.g., including at least one of A, B, and C, which may denote the inclusion of any one or more elements selected from the set consisting of A, B, and C.

It is found that data in the storage system usually changes, thus, before using the data, it is usually necessary to merge the related data, all the data that needs to be read is usually loaded into a memory for merging. When the data volume is large, it may cause the data to overflow to a disk, resulting in the degradation of data reading performance.

Based on the above research, the present disclosure provides a data processing method, apparatus, electronic device, and storage medium. Firstly, acquiring a data reading task, in which the data reading task is configured to indicate target feature data to be read currently; secondly, determining the target feature data from a data file stored in a target storage system based on the data reading task and metadata corresponding to the target storage system, in which the feature data in the data file is stored in columns; then reading the target feature data from the data file based on the operation semantic information corresponding to the target feature data, and determining the read target feature data as the first target feature data, in which the operation semantic information comprises one of update semantics, insertion semantics, deletion semantics, and insertion-update semantics; finally, in the case that the size of data volume of the read first target feature data meets a preset condition, merging the first target feature data to acquire target merged feature data, and repeating the process of reading and merging the first target feature data until the completion of reading of the target feature data in the data file. Compared with the related technology that all the feature data is loaded into the memory for merging, the embodiment in the present disclosure is not necessary to load all the target feature data into the memory at one time, and the target feature data is loaded and merged in batches, thus avoiding the data overflowing to the disk and further avoiding performance degradation.

In addition, because the feature data in each data file is stored in columns, there is no need to serialize and deserialize the data during the process of a merge-on-read, thereby reducing the overhead of data processing and improving the efficiency of data reading.

In order to facilitate the understanding of the embodiments of the present disclosure, firstly, the executive body of the data processing method provided by the embodiment of the present disclosure is introduced in detail. The execution subject of the data processing method provided by the embodiment of the present disclosure is electronic device. In the embodiment, the electronic device is a server, which may be an independent physical server, a server cluster or a distributed system composed of multiple physical servers, and a cloud server that provides basic cloud computing services such as cloud services, cloud databases, cloud computing, cloud storage, big data, and artificial intelligence platforms. In other embodiments, the electronic device can also be a terminal device, and the terminal device may be a mobile device, a user terminal, a handheld device, a computing device, a wearable device and the like. In addition, the data processing method can also be implemented by the processor invoking the computer-readable instructions stored in the memory.

The data processing method provided by the embodiment of the present disclosure is described in detail with attached drawings. Referring to FIG. 1, it is a flowchart of a data processing method provided by an embodiment of the present disclosure, which includes steps S101~S104.

S101, acquiring a data reading task, in which the data reading task is used for indicating the target feature data to be read currently.

In the embodiment of the present disclosure, the data reading task refers to reading the target feature data from a target storage system. The target storage system is provided with a preset number of bucket partitions, each of the bucket partitions corresponds to a sub-storage space of the target storage system, and the data file is stored in the sub-storage space corresponding to a bucket partition, that is, the data reading task is to determine the target feature data from the data file in the bucket partition in the target storage system.

The data file includes multiple feature data stored in columns, that is, each data file is a file in a column-storage format. In the embodiment of the present disclosure, the format of the data file is Parquet format, and in other embodiments, the format of the data file may also be ORC format, which is not limited here.

Optionally, the feature data included in the data file may include the usage behavior data of a user in the process of using a target application, and the usage behavior data includes sample data and/or sample tag data. The sample data and the sample tag data are used to train a model, and the trained model can be used to predict the user's target usage behavior, and display a content matching the target usage behavior to the user based on the target usage behavior. In other embodiments, the data file stored in the target storage system may also be the user data that needs to be retained based on the compliance requirements of the General Data Protection Regulation (GDPR).

For example, the target applications can be short video applications, news applications, shopping applications, and etc., which are not specifically limited here. The sample data refers to the data used to characterize the user behavior, and the sample tag data refers to the data used to characterize user behavior results. For different types of applications, the content of the sample data and the content of the sample tag data are different.

For example, for news applications, the sample data may be the related data such as a browsing content and a browsing duration for browsing news by users, and accordingly, the sample tag data may be collection, praise, or click data for a certain news content. For shopping applications, the sample data may be consumption data for searching or watching a certain shopping content by users, and accordingly, the sample tag data may be related data indicating whether the user places an order to buy or adds a certain commodity to a shopping cart. For short video applications, the sample data may be the duration data or frequency data for watching a certain type of videos or a certain video by users, and the sample tag data may be the data indicating whether the user is interested in the video or not.

It should be noted that the occurrence time of the sample data is usually earlier than the occurrence time of the sample tag data. In addition, the above examples about the sample data and the sample tag data are only schematic. In other embodiments, for different types of applications, the sample data and the sample tag data may also be determined according to actual application requirements. In addition, the classification of the above-mentioned target applications is only an example, and some applications may correspond to several different categories, for example, some short video applications actually have the shopping functions, and may also be shopping applications.

S102, determining the target feature data from a data file stored in a target storage system based on the data reading task and metadata corresponding to the target storage system, in which feature data in the data file is stored in columns.

The metadata, also known as intermediate data or relay data, refers to the information describing data attributes, which can indicate data storage location, historical data, resource search, or file records, and etc.

In the embodiment of the present disclosure, the metadata corresponding to the target storage system indicates that the data file in the target storage system has the metadata which is used to indicate the feature data included in the data file, the operation semantic information of the feature data, and the data type of the feature data. The operation semantic information includes one of update semantics, insertion semantics, deletion semantics, and insertion-update semantics.

Optionally, the metadata of the data file also includes a primary key corresponding to each feature data. The primary key, also known as a primary keyword, is one or more fields in a table, the value of which is used to uniquely identify one record in the table.

Since the data reading task indicates the target feature data that needs to be read currently, the target feature data can be determined from the data file stored in the target storage system based on the data reading task and the metadata corresponding to the target storage system. That is, it can be determined that in which data files the target feature data that needs to be read currently exists.

In the embodiment of the present disclosure, because the data in the target storage system is loaded from some data sources (such as the distributed file system HDFS, Object Store) in the form of data streams, the data in the data sources can be pre-cached to the target storage system, so that the target storage system can provide the cached data at the first time during the subsequent data reading and data merging, thereby reducing the delay caused by the factors such as the network, and improving the efficiency of data processing.

S103, reading the target feature data from the data file based on operation semantic information corresponding to the target feature data, and determining the read target feature data as the first target feature data.

After determining the target feature data from the data file stored in the target storage system, the target feature data can be read from the data file based on the operation semantic information corresponding to the target feature data. The detailed process of feature data reading is described in following embodiments.

S104, in the case that the size of data volume of the read first target feature data meets a preset condition, merging the first target feature data to acquire target merged feature data, and repeating the process of reading and merging the first target feature data until the completion of reading of the target feature data in the data file.

The preset condition may refer to the preset data volume, and the preset data volume may be determined according to the size of storage space of the memory. For example, when the target feature data includes 1000 lines and the preset condition indicates that the preset data volume is 200 lines, 200 lines are read for merging at a time, and then another 200 lines are read for merging, and so on, until the reading for all 1000 lines of the target feature data is completed.

For example, in the case where the target feature data 1 contained in the data file is Zhang San and the height is 180 and the target feature data 2 is Zhang San and the height is 170, it is necessary to merge the target feature data 1 and the target feature data 2. For another example, in the case where the target feature data 1 is Zhang San and the height is 180, and the target feature data 2 is Zhang San and the gender is male, then it is necessary to merge the target feature data 1 and the target feature data 2 to ensure the integrity of the feature data.

When reading the first target feature data from the target storage system, in the case that the size of data volume of the first target feature data meets the preset condition, the first target feature data is merged to acquire the target merged feature data, so that the data in the memory does not overflow to the disk, and the performance degradation of data reading can be avoided.

Figure 2:
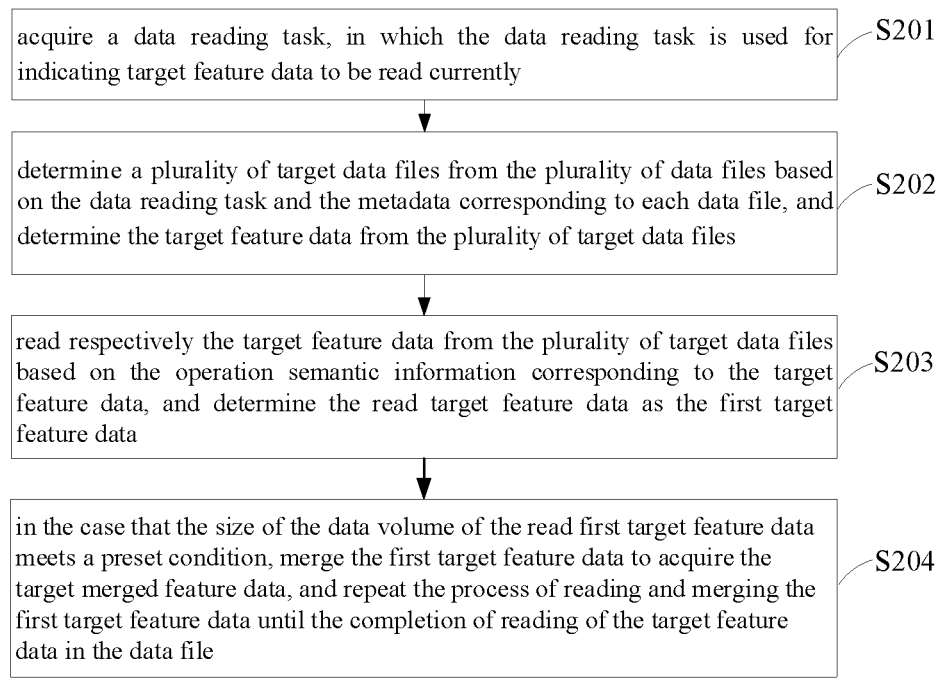
FIG. 2 illustrates a flowchart of a data processing method provided by other embodiments of the present disclosure.

In some embodiments, the target storage system may include a plurality of data files. Please refer to FIG. 2, which is a flowchart of another data processing method provided by an embodiment of the present disclosure. The method includes steps S201~S204.

S201, acquiring a data reading task, in which the data reading task is used for indicating target feature data to be read currently.

Step S201 is similar to step S101 in the above embodiment. Please refer to step S101 for the detailed description, which is not repeated here.

S202, determining a plurality of target data files from the plurality of data files based on the data reading task and the metadata corresponding to each data file, and determining the target feature data from the plurality of target data files.

When determining the plurality of target data files from the plurality of data files stored in the target storage system, the determination can be made by partition filtering or predicate filtering. The partition filtering refers to the filtering according to the date or time, for example, determining the data files within a week, and the predicate filtering refers to the filtering by setting some filtering conditions.

It should be understood that the target feature data currently to be read may be distributed in different data files, thus, it is necessary to determine the plurality of target data files from the plurality of data files based on the data reading task and the corresponding metadata of each data file, and determine the target feature data from the plurality of target data files, so that the integrity of target feature data can be improved and the data omission can be avoided.

S203, reading respectively the target feature data from the plurality of target data files based on the operation semantic information corresponding to the target feature data, and determining the read target feature data as the first target feature data.

Step S203 is similar to step S103 in the above embodiment, please refer to step S103 for the detailed description, which is not repeated here.

The reading process of the feature data is described in detail below.

Optionally, because the feature data in the target data files is all stored in columns, before reading the target feature data, the memory view of the feature data stored in columns in each target data file can be converted into the memory view stored in rows, and then the target feature data can be read from the plurality of target data files respectively based on the operation semantic information corresponding to the target feature data, and the read target feature data can be determined as the first target feature data. In the case that the size of the data volume of the read first target feature data meets the preset condition, the first target feature data is merged to acquire the first merged feature data. After acquiring the first merged feature data, the memory view stored in rows for the first merged feature data is converted into the memory view stored in columns to acquire the target merged feature data.

It should be noted that, for the feature data in each target data file, only the memory view changes, and the data is still stored in columns actually.

In some embodiments, the multi-core parallel mode can be adopted to read the target feature data from the plurality of target data files, and the read target feature data is determined as the first target feature data. The multi-core mode indicates that reading a batch of data per one data reading instruction, that is, one data reading instruction can read the target feature data from multiple target data files. Specifically, the multi-core mode can be implemented by the SIMD instruction set of CPU (such as SSE, AVX2, and AVX2 under x86 architecture), so that the efficiency of data reading can be improved.

S204, in the case that the size of the data volume of the read first target feature data meets a preset condition, merging the first target feature data to acquire the target merged feature data, and repeating the process of reading and merging the first target feature data until the completion of reading of the target feature data in the data file.

Steps S203~S204 are similar to steps S103~S104 in the above embodiment. Please refer to the detailed description of steps S103~S104 for details, which is not repeated here.

Optionally, in the case where the size of data volume of the read first target feature data meets the preset condition, when the first target feature data is merged to acquire the first merged feature data, the first target feature data having the same primary key can be merged based on a preset merging rule to acquire the first sub-merged feature data corresponding to each primary key, and then the first merged feature data can be acquired based on the first sub-merged feature data corresponding to each primary key.

The preset merging rule can be a user-defined rule, and in some embodiments, the feature data can be merged according to the writing time of the feature data. For example, the feature data having the latest change time can be taken as a final output, or the feature data having the earliest change time can be taken as the final output.

For example, the first target feature data having the same primary key may include the first target feature data 1 and the first target feature data 2. The first target feature data 1 is Zhang San and the height 180, the first target feature data 2 is Zhang San and the height 175, and the writing time of the first target feature data 2 is later than the writing time of the first target feature data 1, so the first target feature data 2 can be used as the first sub-merged feature data. For another example, the first target feature data 1 is Zhang San and the height 180, and the first target feature data 2 is Zhang San, and the weight is 150. In this case, the two first target feature data can be directly merged to acquire the first sub-merged feature of Zhang San, the height 180, and the weight 150.

In other embodiments, the first target feature data can be merged according to the version number of the target data file to which each first target feature data having the same primary key belongs. For example, from the first target feature data, the third target feature data belonging to the target data file having the latest version number is determined, and the third target feature data is determined as the first sub-merged feature data corresponding to the primary key. It is also possible to determine the target feature data belonging to the target data file having the latest version number as the first sub-merged data corresponding to the primary key. In addition, the event-type feature data can be written into the data file, and multiple event-type feature data belonging to the same primary key can be spliced in the same data file. For numerical feature data, the operations such as summation can also be performed on the feature data.

Figure 3:
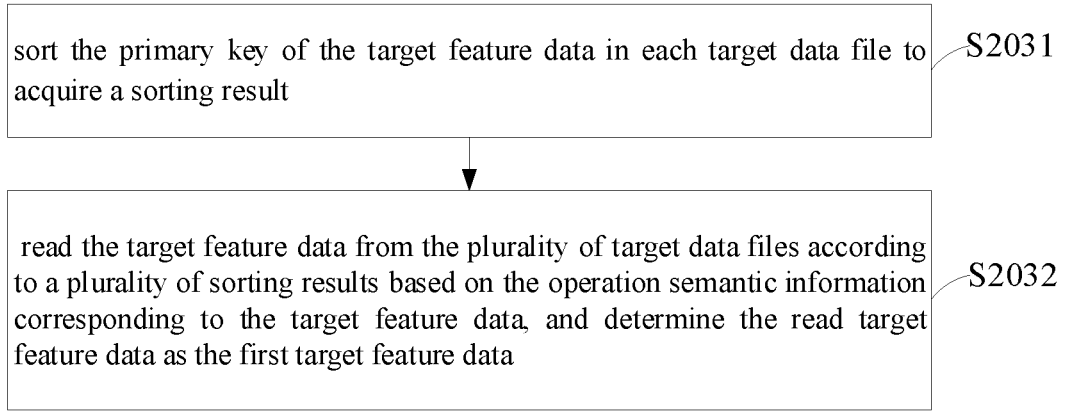
FIG. 3 illustrates a flowchart of a method for reading target feature data provided by some embodiments of the present disclosure.

Optionally, for step S203, the operations of reading respectively the target feature data from the plurality of target data files based on the operation semantic information corresponding to the target feature data, and determining the read target feature data as the first target feature data may include the following steps S2031~S2032, please refer to FIG. 3.

S2031, sorting the primary key of the target feature data in each target data file to acquire a sorting result.

Optionally, the metadata of each data file further includes the writing time of each feature data. In the case that the target feature data having the same primary key exists, the target feature data having the same primary key can be sorted based on the order of the writing time of the target feature data to acquire the sorting result.

S2032, reading the target feature data from the plurality of target data files according to a plurality of sorting results based on the operation semantic information corresponding to the target feature data, and determining the read target feature data as the first target feature data.

Based on the above embodiments, the metadata of each data file includes the primary key corresponding to each feature data. In order to facilitate the data reading, the primary key of the target feature data in each target data file can be sorted to acquire the sorting result, so that the target feature data can be read from the plurality of target data files according to the sorting result corresponding to each target data file, thus avoiding data omission in the data reading process.

For example, for target data file 1, target data file 2, and target data file 3, a row of feature data may be determined from the above three target data files in sequence according to the sorting results, that is, the row of the feature data may be determined from the target data file 1, the row of the feature data may be determined from the target data file 2, and the row of the feature data may be determined from the target data file 3, and then the next row of the feature data may be determined from the target data file 1, and the next row of feature data may be determined from the target data file 2, and so forth, so as to implement the reading of the target feature data.

In some embodiments, the operations of reading the target feature data from the plurality of target data files according to a plurality of sorting results based on the operation semantic information corresponding to the target feature data, and determining the read target feature data as the first target feature data, may include the following steps (a)~(b).

Step (a), determining whether baseline data corresponding to the current target feature data exists in the target feature data that has been read, according to the current target feature data read by the sorting result, in which the baseline data is the feature data that has the same primary key of the target feature data and is processed for the first time.

Step (b), in the case that the baseline data corresponding to the current target feature data exists and the operation semantic information of the current target feature data is one of the update semantics, the insertion semantics, and the insertion-update semantics, determining the current target feature data as change data, and in the case that reading of the target feature data corresponding to the primary key of the current target feature data is completed, storing the baseline data and the change data into a container, and determining the baseline data and the change data as the first target feature data.

For example, taking current target feature data "a" in the target data file 1 as an example, the current target feature data "a" has a row primary key 001, it is determined that whether the baseline data corresponding to the current target feature data "a" exists. The baseline data indicates whether, before determining the current target feature data "a", the feature data that has the same row primary key 001 of the current target feature data "a" and is processed for the first time is determined from each target data file. In the case that the baseline data (e.g., the target feature data "b") corresponding to the current target feature data "a" exists and the operation semantic information of the current target feature data "a" is one of the update semantics, the insertion semantics, and the insertion-update semantics, the current target feature data "a" is determined to be change data, so that, each of the determined target feature data is determined in accordance with the above process, so that the baseline data and the change data having the same primary key 001 are acquired. In the case where the row primary key of the currently determined target feature data (e.g., the target feature data "c") is different from the row primary key 001 of the existing baseline data (the target feature data "b"), the existing baseline data (the target feature data "b") and the determined change data (the target feature data "a") corresponding to the baseline data can be temporarily stored in a container, and the baseline data and the change data can be determined as the first target feature data.

Optionally, in the case that the baseline data corresponding to the current target feature data does not exist and the operation semantic information of the current target feature data is the insertion semantics or the insertion-update semantics, the current target feature data is taken as the baseline data.

Optionally, in the case that the baseline data corresponding to the current target feature data exists and the operation semantic information of the current target feature data is the deletion semantics, the baseline data and the current target feature are deleted, so that, the invalid merging of the feature data having the deletion semantics as the operation semantic information can be avoided.

In some embodiments, the metadata of each data file further includes the file attribute information corresponding to each data file. For step S202, the determining the target feature data from the plurality of target data files may include the following steps:

(1) acquiring the first filtering requirement in the case that the first target data file having file attribute information as a newly added attribute exists among the plurality of target data files, in which the first target data file having the newly added attribute indicates that the feature data in the first target data file is different from the feature data in other target data files except the first target data file among the plurality of target data files;

(2) based on the first filtering requirement, determining the fourth target feature data meeting the first filtering requirement from the first target data file and the target primary key corresponding to the fourth target feature data, in which the first filtering requirement is determined by a user;

(3) for each target primary key, determining the fifth target feature data corresponding to the target primary key from other target data files except the first target data file among the plurality of target data files;

(4) determining the fourth target feature data and the fifth target feature data corresponding to each target primary key as the target feature data.

For example, please refer to Table 1, Table 2, and Table 3. Table 1 includes the feature data in target data file 1, the feature data includes the column of row primary keys, the column of names, and the column of scores. Table 2 includes the feature data in target data file 2, the target data file 2 is an updated data file (or a backfilled data file), that is, the target data file 2 is the first target data file, and the target data file 2 includes the column of row primary keys and the column of subjects.

TABLE 1

| row primary key | name | score |
|---|---|---|
| 1 | name 1 | 95 |
| 2 | name 2 | 100 |
| 3 | name 3 | 93 |
| 4 | name 4 | 97 |

TABLE 2

| row primary key | subject |
|---|---|
| 1 | subject 1 |
| 2 | NULL |
| 3 | subject 2 |
| 4 | subject 3 |

When merging the target data file 1 and the target data file 2, in the case where the first filtering requirement is that the score>=97 and the subject of interest is not null, the data that meets the first filtering requirement can be determined from the target data file 1 and the target data file 2, respectively. That is, the first target feature data with the score >=97 is determined from the target data file 1, since the row primary key is also required to be read during the merge-on-read, the data read out includes the feature data with the score>=97 and the corresponding row primary key 4. Then, based on the currently determined data, other feature data with row primary key 4 is determined from the target data file 1 and the target data file 2 respectively. That is, the feature data corresponding to the row primary key 4 is read from the target data file 1, for example, name 4, and the feature data corresponding to the row primary key 4 is read from the target data file 2, for example, subject 3, so that the name 4 and the subject 3 can be taken as the target feature data.

After the target feature data is determined, the determined target feature data can be merged to acquire the merged data file as shown in Table 3, which includes primary key 4, name 4, score 97 and subject 3, so that the pre-filtering of the feature data is implemented and the target merged feature data is acquired.

TABLE 3

| row primary key | name | score | subject |
|---|---|---|---|
| 4 | name 4 | 97 | subject 3 |

In some embodiments, the metadata of each data file further includes the file attribute information corresponding to each data file, and the target feature data is read from the data file in the case that the file attribute information of the data file indicates that the data file is a merged data file.

In the embodiment of the present disclosure, since the data file is a Parquet file, the Parquet file can be composed of one or more Row Group, that is, the data file includes a plurality of sub-data files, and the merged data file can be filtered in the manner similar to SQL (Structured Query Language) filtering.

For example, for the merged data file, in the case where the merged data file includes tens of thousands of columns of feature data, the feature data is distributed in different sub-data files. Some of the sub-data files include positive examples, and some of the sub-data files include negative examples. In the case where the user only needs positive examples for model training, the at least one target sub-data file including positive examples can be determined from the plurality of sub-data files by means of the second filtering requirement, and the feature data is read from the at least one target sub-data file, so that, the feature data that does not satisfy the second filtering requirement can be filtered out, which is conducive to improving the efficiency of data reading.

Optionally, when the user backfills a data file (e.g., adding new feature data) into the target storage system, the data file can be tagged (e.g., which columns are updated), and when performing the merge-on-read, only feature columns that are tagged as updated can be processed. Optionally, embodiments of the present disclosure further support expressing whether the null value (NULL) in the feature column is valid or invalid by the column of meta-information. For example, when backfilling the feature data, in the case where only the feature is backfilled and the tag is not backfilled, the tag may be assigned the NULL to indicate that the data in the column is invalid (i.e., no processing is required), or, in the case that the feature data is non-compliant, the feature data may be assigned by the NULL to indicate that the feature data is overwritten (or deleted).

It is understood by those skilled in the art that in specific embodiments of the above method, the order in which the steps are written does not imply any limitation of the implementation process by implying a strict order of execution, and that the specific order in which the steps are to be executed should be determined in terms of their functionality and possible internal logic.

Based on the same inventive concept, the embodiment of the present disclosure also provides a data processing apparatus corresponding to the data processing method. Since the principle of solving problems by the apparatus in the embodiment of the present disclosure is similar to the above data processing method in the embodiment of the present disclosure, the implementation of the apparatus can refer to the implementation of the method, and the repetition will not be repeated.

Figure 4:
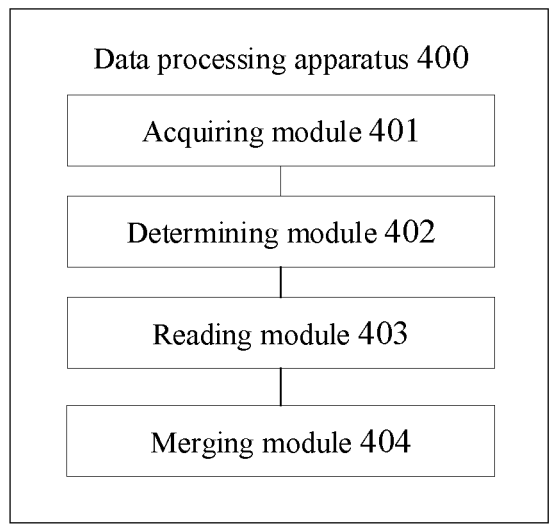
FIG. 4 illustrates a schematic diagram of a data processing apparatus provided by some embodiments of the present disclosure.

Referring to FIG. 4, a schematic diagram of the data processing apparatus 400 provided by an embodiment of the present disclosure. The data processing apparatus 400 includes: an acquiring module 401, a determining module 402, a reading module 403, and a merging module 404.

The acquiring module 401 is configured to acquire a data reading task. The data reading task is used for indicating target feature data to be read currently.

The determining module 402 is configured to determine the target feature data from a data file stored in a target storage system based on the data reading task and metadata corresponding to the target storage system. The feature data in the data file is stored in columns.

The reading module 403 is configured to read the target feature data from the data file based on operation semantic information corresponding to the target feature data, and determine the read target feature data as the first target feature data. The operation semantic information comprises one of update semantics, insertion semantics, deletion semantics, and insertion-update semantics.

The merging module 404 is configured to merge the first target feature data to acquire target merged feature data in the case that the size of data volume of the read first target feature data meets a preset condition, and repeat the process of reading and merging the first target feature data until the completion of reading of the target feature data in the data file.

In an implementation, the target storage system stores a plurality of data files, and each of the plurality of data files corresponds to one metadata, and the determining module 402 is configured to:
  determine a plurality of target data files from the plurality of data files based on the data reading task and metadata corresponding to each data file, and determine the target feature data from the plurality of target data files.
The reading module 403 is configured to:
  read respectively the target feature data from the plurality of target data files based
  on the operation semantic information corresponding to the target feature data, and determine the read target feature data as the first target feature data.

In an implementation, the reading module 403 is configured to:
  convert a memory view of feature data stored in columns in each target data file into a memory view stored in rows; and
  read respectively the target feature data from the plurality of target data files based on the operation semantic information corresponding to the target feature data, and determine the read target feature data as the first target feature data.

The merging module 404 is configured to:
  in the case that the size of data volume of the read first target feature data meets the preset condition, merge the first target feature data to acquire first merged feature data; and
  convert a memory view stored in rows of the first merged feature data into a memory view stored in columns to acquire the target merged feature data.

In an implementation, the reading module 403 is configured to:
  read respectively the target feature data from the plurality of target data files in a multi-core parallel mode, based on the operation semantic information corresponding to the target feature data, and determine the read target feature data as the first target feature data.

In an implementation, the metadata of each data file comprises a primary key corresponding to each feature data, and the reading module 403 is configured to:
  sort a primary key of the target feature data in each target data file to acquire a sorting result; and
  read the target feature data from the plurality of target data files according to a plurality of sorting results based on the operation semantic information corresponding to the target feature data, and determine the read target feature data as the first target feature data.

In an implementation, the metadata of each data file further comprises a writing time of each feature data, and the reading module 403 is configured to:
  in the case that target feature data having the same primary key exists, sort the target feature data having the same primary key based on a sequence of writing times of the target feature data to acquire the sorting result.

In an implementation, the reading module 403 is configured to:
  determine, for current target feature data read according to each sorting result, whether baseline data corresponding to the current target feature data in the target feature data that has been read exists or not, in which the baseline data is feature data that has the same primary key of the target feature data and is processed for the first time;
  in the case that the baseline data corresponding to the current target feature data exists and the operation semantic information of the current target feature data is one of the update semantics, the insertion semantics, and the insertion-update semantics, determine the current target feature data as change data, and in the case that reading of the target feature data corresponding to the primary key of the current target feature data is completed, store the baseline data and the change data into a container, and determine the baseline data and the change data as the first target feature data.

In an implementation, the reading module 403 is configured to:
  in the case that the baseline data corresponding to the current target feature data does not exist and the operation semantic information of the current target feature data is the insertion semantics or the insertion-update semantics, determine the current target feature data as the baseline data.

In an implementation, the reading module 403 is configured to:

in the case that the baseline data corresponding to the current target feature data exists and the operation semantic information of the current target feature data is the deletion semantics, delete the baseline data and the current target feature.

In an implementation, the metadata of each data file comprises a primary key corresponding to each feature data, the merging module 404 is configured to:

merge the first target feature data having the same primary key based on a preset merging rule to acquire first sub-merged feature data corresponding to each primary key; and acquire the first merged feature data based on the first sub-merged feature data corresponding to each primary key.

In an implementation, the metadata of each data file further comprises a writing time of each feature data and a version number corresponding to each data file, and in the case that the first target feature data having the same primary key is the same feature data, the merging module 404 is configured to:

according to the writing time of each first target feature data having the same primary key, determine the second target feature data corresponding to last writing time from the first target feature data, and determine the second target feature data as the first sub-merged feature data corresponding to the primary key; or, according to a version number of a target data file to which each first target feature data having the same primary key belongs, determine the third target feature data belonging to the target data file having the latest version number from the first target feature data, and determine the third target feature data as the first sub-merged feature data corresponding to the primary key.

In an implementation, the metadata of each data file further comprises file attribute information corresponding to each data file, and the determining module 402 is configured to:

acquire the first filtering requirement in the case that the first target data file having file attribute information as a newly added attribute exists among the plurality of target data files, in which the first target data file having the newly added attribute indicates that feature data in the first target data file is different from feature data in other target data files except the first target data file among the plurality of target data files;

based on the first filtering requirement, determine the fourth target feature data meeting the first filtering requirement from the first target data file and a target primary key corresponding to the fourth target feature data, in which the first filtering requirement is determined by a user;

for each target primary key, determine the fifth target feature data corresponding to a target primary key from other target data files except the first target data file among the plurality of target data files; and determine the fourth target feature data and the fifth target feature data corresponding to each target primary key as the target feature data.

In an implementation, the metadata of the data file further comprises file attribute information corresponding to the data file, and the reading module 403 is configured to:

read the target feature data from the data file in the case that the file attribute information of the data file indicates that the data file is a merged data file.

For the description of the processing flow of each module in the apparatus and the interaction flow between modules, please refer to the relevant description in the above method embodiment, and will not be described in detail here.

Figure 5:
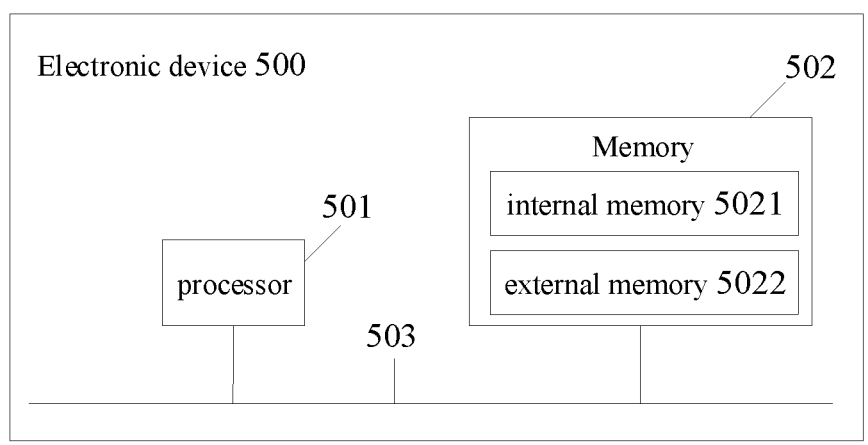
FIG. 5 illustrates a schematic diagram of an electronic device provided by some embodiments of the present disclosure.

Based on the same technical concept, the embodiment of the disclosure also provides an electronic device. Referring to FIG. 5, the structural diagram of the electronic device 500 provided by an embodiment of the present disclosure includes a processor 501, a memory 502, and a bus 503. The memory 502 is configured to store execution instructions, including an internal memory 5021 and an external memory 5022. The internal memory 5021 here is also referred as to the internal storage, which is configured to temporarily store the operation data in the processor 501 and the data exchanged with the external memory 5022 such as a hard disk. The processor 501 exchanges data with the external memory 5022 through the internal memory 5021.

In the embodiment of the present disclosure, the memory 502 is configured to store application program code for executing the schemes of the present disclosure, and the execution is controlled by the processor 501. That is, when the electronic device 500 is in operation, the processor 501 communicates with the memory 502 through the bus 503, so that the processor 501 executes the application code stored in the memory 502, and then performs the method described in any of the aforementioned embodiments.

The memory 502 may be, but is not limited to, a Random Access Memory (RAM), a Read Only Memory (ROM), a Programmable Read-Only Memory (PROM), an Erasable programmable read-only memory (EPROM), an electrically erasable programmable read-only memory (EEPROM), etc.

The processor 501 may be an integrated circuit chip with signal processing capability. The processor described above may be a general processor, including a Central Processing Unit (CPU) and a Network Processor (NP). It may also be a digital signal processor (DSP), an application specific integrated circuit (ASIC), a field programmable gate array (FPGA) or other programmable logic devices, discrete gate or transistor logic devices, and discrete hardware components. The methods, steps and logic blocks disclosed in the embodiments of the present disclosure can be realized or executed. The general processor may be a microprocessor or any conventional processor, and etc.

It can be understood that the schematic structure of the embodiment of the present disclosure does not constitute a specific limitation to the electronic device 500. In other embodiments of the present disclosure, the electronic device 500 may include more or fewer components than shown, or combine some components, or split some components, or have different component arrangements. The illustrated components may be implemented in hardware, software or a combination of software and hardware.

The embodiment of the present disclosure also provides a computer-readable storage medium, and computer programs are stored on the computer-readable storage medium. When the computer programs are executed by a processor, the steps of data processing method in the above method embodiment are executed. The storage medium may be a volatile or nonvolatile computer-readable storage medium.

The embodiment of the present disclosure also provides a computer program product. The computer program product carries program code, and the program code includes instructions that can be used to execute the steps of the data processing method in the above-mentioned method embodiment. For details, please refer to the above-mentioned method embodiment, which is not repeated here.

The computer program products may be realized by hardware, software or their combination. In one alternative embodiment, the computer program product is embodied as a computer storage medium, and in another alternative embodiment, the computer program product is embodied as a software product, such as a Software Development Kit (SDK) and the like.

It can be clearly understood by those skilled in the art that for the convenience and conciseness of description, the specific working process of the system and device described above can refer to the corresponding process in the aforementioned method embodiment, and will not be repeated here. In several embodiments provided by this disclosure, it should be understood that the disclosed system, apparatus, device and method can be realized in other ways. The apparatus embodiments described above are only schematic. For example, the division of the modules is only a logical function division, and there may be another division method in actual implementation. For example, a plurality of modules or components may be combined or integrated into another system, or some features may be ignored or not implemented. On the other hand, the mutual coupling or direct coupling or communication connection shown or discussed can be indirect coupling or communication connection through some communication interfaces, devices or units, which can be in electrical, mechanical or other forms.

The module described as separate components may or may not be physically separated, and the components displayed as module may or may not be physical units, that is, they may be located in one place or distributed to multiple network units. Some or all of the units can be selected according to actual needs to achieve the purpose of this embodiment.

In addition, each functional module in each embodiment of the present disclosure may be integrated into one processing module, or each module may exist physically alone, or two or more modules may be integrated into one module.

If the functions are realized in the form of software functional modules and sold or used as independent products, they can be stored in a processor-executable nonvolatile computer-readable storage medium. Based on this understanding, the technical solution of the present disclosure can be embodied in the form of a software product, which is stored in a storage medium and includes several instructions to make an electronic device (which can be a personal computer, a server, a network device, etc.) execute all or part of the steps of the method described in various embodiments of the present disclosure. The aforementioned storage media include: U disk, mobile hard disk, read-only memory, random access memory, magnetic disk or optical disk and other media that can store program codes.

Finally, it should be noted that the above-described embodiments are only specific embodiments of the present disclosure to illustrate the technical solutions of the present disclosure rather than to limit them, and the scope of protection of the present disclosure is not limited thereto. Although the present disclosure has been described in detail with reference to the foregoing embodiments, the person of ordinary skill in the art should understand that, within the scope of the technology disclosed in the present disclosure, any person of skill familiar with the field of the technology can still modify or easily think of changes to the technical solutions recorded in the foregoing embodiments, or make equivalent substitutions for some of the technical features therein; and these modifications, changes or substitutions, which do not detach the essence of the corresponding technical solutions from the spirit and scope of the technical solutions of the embodiments of the present disclosure, shall be covered within the scope of protection of the present disclosure. Therefore, the scope of protection of the present disclosure shall be stated to be subject to the scope of protection of the claims.

The invention claimed is:

1. A data processing method, comprising:
acquiring a data reading task, wherein the data reading task is used for indicating target feature data to be read currently;
determining the target feature data from a data file stored in a target storage system based on the data reading task and metadata corresponding to the target storage system, wherein feature data in the data file is stored in columns;
reading the target feature data from the data file based on operation semantic information corresponding to the target feature data, and determining the read target feature data as first target feature data, wherein the operation semantic information comprises one of update semantics, insertion semantics, deletion semantics, and insertion-update semantics;
merging the read first target feature data to acquire target merged feature data in response to a size of data volume of the read first target feature data reaching a preset data volume, and
repeating the process of reading and merging until the reading of the target feature data in the data file is completed, wherein a data volume of the target feature data is greater than the preset data volume.

2. The method according to claim 1, wherein the target storage system stores a plurality of data files, and each of the plurality of data files corresponds to one metadata, and the determining the target feature data from a data file stored in a target storage system based on the data reading task and metadata corresponding to the target storage system, comprises:
determining a plurality of target data files from the plurality of data files based on the data reading task and metadata corresponding to each data file, and determining the target feature data from the plurality of target data files;
the reading the target feature data from the data file based on operation semantic information corresponding to the target feature data, and determining the read target feature data as first target feature data, comprises:
reading respectively the target feature data from the plurality of target data files based on the operation semantic information corresponding to the target feature data, and determining the read target feature data as the first target feature data.

3. The method according to claim 2, wherein the reading the target feature data from the data file based on operation semantic information corresponding to the target feature data, and determining the read target feature data as the first target feature data, comprises:
converting a memory view of feature data stored in columns in each target data file into a memory view stored in rows; and
reading respectively the target feature data from the plurality of target data files based on the operation semantic information corresponding to the target feature data, and determining the read target feature data as the first target feature data;

the merging the read first target feature data to acquire target merged feature data in response to a size of data volume of the read first target feature data reaching a preset data volume, comprises:
  in response to the size of data volume of the read first target feature data meeting the preset condition, merging the first target feature data to acquire first merged feature data; and
  converting a memory view stored in rows of the first merged feature data into a memory view stored in columns to acquire the target merged feature data.

4. The method according to claim 3, wherein the reading respectively the target feature data from the plurality of target data files based on the operation semantic information corresponding to the target feature data, and determining the read target feature data as the first target feature data, comprises:
  reading respectively the target feature data from the plurality of target data files in a multi-core parallel mode, based on the operation semantic information corresponding to the target feature data, and determining the read target feature data as the first target feature data.

5. The method according to claim 3, wherein metadata of each data file comprises a primary key corresponding to each feature data, and the reading respectively the target feature data from the plurality of target data files based on the operation semantic information corresponding to the target feature data, and determining the read target feature data as the first target feature data, comprises:
  sorting a primary key of the target feature data in each target data file to acquire a sorting result; and
  reading the target feature data from the plurality of target data files according to a plurality of sorting results based on the operation semantic information corresponding to the target feature data, and determining the read target feature data as the first target feature data.

6. The method according to claim 5, wherein the metadata of each data file further comprises a writing time of each feature data, and the sorting a primary key of the target feature data in each target data file to acquire a sorting result, comprises:
  in a case that target feature data having a same primary key exists, sorting the target feature data having the same primary key based on a sequence of writing time of the target feature data to acquire the sorting result.

7. The method according to claim 5, wherein the reading the target feature data from the plurality of target data files according to a plurality of sorting results based on the operation semantic information corresponding to the target feature data, and determining the read target feature data as the first target feature data, comprises:
  determining, for current target feature data read according to each sorting result, whether baseline data corresponding to the current target feature data exists in the target feature data that has been read, wherein the baseline data is feature data that has a same primary key of the target feature data and is processed for a first time; and
  in a case that the baseline data corresponding to the current target feature data exists and the operation semantic information of the current target feature data is one of the update semantics, the insertion semantics, and the insertion-update semantics, determining the current target feature data as change data, and in a case that reading of the target feature data corresponding to the primary key of the current target feature data is completed, storing the baseline data and the change data into a container, and determining the baseline data and the change data as the first target feature data.

8. The method according to claim 7, further comprising:
  in a case that the baseline data corresponding to the current target feature data does not exist and the operation semantic information of the current target feature data is the insertion semantics or the insertion-update semantics, determining the current target feature data as the baseline data.

9. The method according to claim 7, further comprising:
  in a case that the baseline data corresponding to the current target feature data exists and the operation semantic information of the current target feature data is the deletion semantics, deleting the baseline data and the current target feature.

10. The method according to claim 3, wherein metadata of each data file comprises a primary key corresponding to each feature data, the in response to the size of data volume of the read first target feature data meets the preset condition, merging the first target feature data to acquire first merged feature data, comprises:
  merging first target feature data having a same primary key based on a preset merging rule to acquire first sub-merged feature data corresponding to each primary key; and
  acquiring the first merged feature data based on the first sub-merged feature data corresponding to each primary key.

11. The method according to claim 10, wherein the metadata of each data file further comprises a writing time of each feature data and a version number corresponding to each data file, and in a case that the first target feature data having the same primary key is same feature data, the merging the first target feature data having the same primary key based on a preset merging rule to acquire first sub-merged feature data corresponding to each primary key, comprises:
  according to the writing time of each first target feature data having the same primary key, determining second target feature data corresponding to last writing time from the first target feature data, and determining the second target feature data as the first sub-merged feature data corresponding to the primary key; or,
  according to a version number of a target data file to which each first target feature data having the same primary key belongs, determining third target feature data belonging to the target data file having a latest version number from the first target feature data, and determining the third target feature data as the first sub-merged feature data corresponding to the primary key.

12. The method according to claim 2, wherein metadata of each data file further comprises file attribute information corresponding to each data file, and the determining a plurality of target feature data from the plurality of target data files, comprises:
  acquiring a first filtering requirement in a case that a first target data file having file attribute information as a newly added attribute exists among the plurality of target data files, wherein the first target data file having the newly added attribute indicates that feature data in the first target data file is different from feature data in other target data files except the first target data file among the plurality of target data files;
  based on the first filtering requirement, determining fourth target feature data meeting the first filtering requirement from the first target data file and a target primary key corresponding to the fourth target feature data, wherein the first filtering requirement is determined by a user;

for each target primary key, determining fifth target feature data corresponding to a target primary key from other target data files except the first target data file among the plurality of target data files; and determining the fourth target feature data and the fifth target feature data corresponding to each target primary key as the target feature data.

13. The method according to claim 1, wherein metadata of the data file further comprises file attribute information corresponding to the data file, and the method further comprises:

reading the target feature data from the data file in a case that the file attribute information of the data file indicates that the data file is a merged data file.

14. An electronic device, comprising:
at least one processor, and
a non-transitory memory with instructions stored thereon, wherein the instructions, upon execution by the at least one processor, cause the at least one processor to:
acquire a data reading task, wherein the data reading task is used for indicating target feature data to be read currently;
determine the target feature data from a data file stored in a target storage system based on the data reading task and metadata corresponding to the target storage system, wherein feature data in the data file is stored in columns;
read the target feature data from the data file based on operation semantic information corresponding to the target feature data, and determine the read target feature data as first target feature data, wherein the operation semantic information comprises one of update semantics, insertion semantics, deletion semantics, and insertion-update semantics;
merge the read first target feature data to acquire target merged feature data in response to a size of data volume of the read first target feature data reaching a preset data volume; and
repeat the process of reading and merging until the reading of the target feature data in the data file is completed, wherein a data volume of the target feature data is greater than the preset data volume.

15. The electronic device according to claim 14, wherein the target storage system stores a plurality of data files, and each of the plurality of data files corresponds to one metadata, and when determining the target feature data from a data file stored in a target storage system based on the data reading task and metadata corresponding to the target storage system, the processor is caused to:

determine a plurality of target data files from the plurality of data files based on the data reading task and metadata corresponding to each data file, and determining the target feature data from the plurality of target data files; and when reading the target feature data from the data file based on operation semantic information corresponding to the target feature data and determining the read target feature data as first target feature data, the processor is caused to:

read respectively the target feature data from the plurality of target data files based on the operation semantic information corresponding to the target feature data, and determine the read target feature data as the first target feature data.

16. The electronic device according to claim 15, wherein when reading the target feature data from the data file based on operation semantic information corresponding to the target feature data, and determining the read target feature data as the first target feature data, the processor is caused to:

convert a memory view of feature data stored in columns in each target data file into a memory view stored in rows; and read respectively the target feature data from the plurality of target data files based on the operation semantic information corresponding to the target feature data, and determine the read target feature data as the first target feature data;

when merging the read first target feature data to acquire target merged feature data in response to a size of data volume of the read first target feature data reaches a preset data volume, the processor is caused to:

in response to the size of data volume of the read first target feature data meets the preset condition, merge the first target feature data to acquire first merged feature data; and convert a memory view stored in rows of the first merged feature data into a memory view stored in columns to acquire the target merged feature data.

17. The electronic device according to claim 16, wherein when reading respectively the target feature data from the plurality of target data files based on the operation semantic information corresponding to the target feature data and determining the read target feature data as the first target feature data, the processor is caused to:

read respectively the target feature data from the plurality of target data files in a multi-core parallel mode, based on the operation semantic information corresponding to the target feature data, and determine the read target feature data as the first target feature data.

18. The electronic device according to claim 16, wherein metadata of each data file comprises a primary key corresponding to each feature data, and when reading respectively the target feature data from the plurality of target data files based on the operation semantic information corresponding to the target feature data, and determining the read target feature data as the first target feature data, the processor is caused to:

sort a primary key of the target feature data in each target data file to acquire a sorting result; and read the target feature data from the plurality of target data files according to a plurality of sorting results based on the operation semantic information corresponding to the target feature data, and determine the read target feature data as the first target feature data.

19. The electronic device according to claim 18, wherein metadata of the data file further comprises file attribute information corresponding to the data file, and the processor is further caused to:

read the target feature data from the data file in a case that the file attribute information of the data file indicates that the data file is a merged data file.

20. A non-transitory computer-readable storage medium storing instructions that, when executed by at least one processor, cause the at least one processor to:

acquire a data reading task, wherein the data reading task is used for indicating target feature data to be read currently;

determine the target feature data from a data file stored in a target storage system based on the data reading task and metadata corresponding to the target storage system, wherein feature data in the data file is stored in columns;

read the target feature data from the data file based on operation semantic information corresponding to the target feature data, and determine the read target feature data as first target feature data, wherein the operation semantic information comprises one of update semantics, insertion semantics, deletion semantics, and insertion-update semantics;

merge the read first target feature data to acquire target merged feature data in response to a size of data volume of the read first target feature data reaching a preset data volume; and repeat the process of reading and merging until the reading of the target feature data in the data file is completed, wherein a data volume of the target feature data is greater than the preset data volume.

* * * * *